United States Patent
Kathayanatt et al.

(10) Patent No.: US 9,752,809 B2
(45) Date of Patent: Sep. 5, 2017

(54) LINEAR OSCILLATION SYSTEM HAVING A SUSPENSION SYSTEM AND A METHOD FOR ASSEMBLING THE SAME

(71) Applicant: GENERAL ELECTRIC COMPANY, Schenectady, NY (US)

(72) Inventors: Savio Sebastian Kathayanatt, Bangalore (IN); Subhrajit Dey, Bangalore (IN); Bhaskar Tamma, Bangalore (IN); Aditya Bhakta, Bangalore (IN); Sandeep Dhar, Bangalore (IN); Parag Mantri, Bangalore (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 261 days.

(21) Appl. No.: 14/596,754

(22) Filed: Jan. 14, 2015

(65) Prior Publication Data
US 2015/0226468 A1   Aug. 13, 2015

(30) Foreign Application Priority Data
Feb. 11, 2014   (IN) .............................. 632/CHE/2014

(51) Int. Cl.
| | | |
|---|---|---|
| *H02K 33/16* | (2006.01) | |
| *F25B 31/02* | (2006.01) | |
| *F04B 35/04* | (2006.01) | |
| *F04B 39/00* | (2006.01) | |
| *F04B 53/14* | (2006.01) | |

(52) U.S. Cl.
CPC .......... *F25B 31/023* (2013.01); *F04B 35/045* (2013.01); *F04B 39/0005* (2013.01); *F04B 53/14* (2013.01); *H02K 33/16* (2013.01); *F25B 2400/073* (2013.01); *Y10T 29/49236* (2015.01)

(58) Field of Classification Search
CPC ........ H02K 33/00; H02K 33/08; H02K 33/16; F04B 15/08; F04B 17/03; F04B 17/04; F04B 17/046; F04B 35/045; F04B 53/00; F04B 53/02; F04B 53/14; F04B 53/16; F16F 7/104; F25B 31/02; F25B 31/023
USPC ................ 310/15, 17, 21, 25, 28, 29, 36, 38
See application file for complete search history.

(56) References Cited

U.S. PATENT DOCUMENTS

| | | | | |
|---|---|---|---|---|
| 4,395,649 | A * | 7/1983 | Thorne .................. | H02K 33/02 310/15 |
| 4,496,292 | A * | 1/1985 | Panick .................. | F02M 37/08 417/252 |
| 5,772,410 | A * | 6/1998 | Chang .................. | F04B 35/045 417/363 |
| 6,247,391 | B1 * | 6/2001 | Murao ................ | F04B 27/1036 92/71 |

(Continued)

Primary Examiner — Tran Nguyen
(74) Attorney, Agent, or Firm — Dority & Manning, P.A.

(57) ABSTRACT

A linear oscillation system comprising a housing, a stationary assembly, a moveable assembly and a suspension system is disclosed. The suspension system is mechanically coupled between the moveable assembly and the housing. The suspension system comprises a plurality of planar elastic members and plurality of longitudinal elastic members disposed between the plurality of planar elastic members. A first end of each of the plurality of planar elastic members is mechanically coupled to at least one of the plurality of planar elastic members. A second end of each of the plurality of longitudinal elastic members is mechanically coupled to the housing.

14 Claims, 5 Drawing Sheets

(56) References Cited

U.S. PATENT DOCUMENTS

| | | | | |
|---|---|---|---|---|
| 6,638,035 B1 * | 10/2003 | Puff | ................ | H02K 33/02 |
| | | | | 417/415 |
| 6,832,899 B2 | 12/2004 | Puff et al. | | |
| 8,157,541 B2 * | 4/2012 | Grethel | ................ | B60K 26/021 |
| | | | | 137/354 |
| 2004/0208759 A1 * | 10/2004 | Hong | ................ | F04B 35/045 |
| | | | | 417/410.1 |
| 2009/0129955 A1 * | 5/2009 | Schubert | ................ | F04B 35/045 |
| | | | | 417/417 |
| 2012/0177513 A1 | 7/2012 | Lilie et al. | | |

\* cited by examiner

LINEAR OSCILLATION SYSTEM HAVING A SUSPENSION SYSTEM AND A METHOD FOR ASSEMBLING THE SAME

BACKGROUND OF THE INVENTION

The invention relates generally to reciprocating systems, and particularly to linear oscillating systems including a suspension system and method for assembling the same.

In general, a linear oscillation system includes a moving member, for example, a piston, which undergoes a reciprocating motion in a stationary member, for example, a cylinder. An example of such a linear oscillation system is a linear compressor used in a refrigerator, wherein the reciprocating motion of the piston compresses a refrigerant. During operation of such a linear oscillation system, the reciprocating motion of the moving member has to be restrained up to a predetermined point such that the moving member does not get disengaged from the stationary member. The restraining is generally done by means of a suspension system, for example, a set of longitudinal springs.

One of the considerations for design of a linear oscillation system is friction between the moving member and the stationary member. For example, in a linear compressor used in a refrigerator, friction between the piston and the cylinder can lead to significant frictional losses, and hence reduced efficiency and higher energy consumption by the refrigerator. A direct contact between the moving member and the stationary member leads to rubbing between the two parts and hence increases friction. Thus, the frictional losses can be reduced if a direct contact between the moving member and the stationary member is avoided during the operation of the linear oscillation system. To prevent the direct contact, the moving member and the stationary member can be positioned in such a way that the axes of the moving member and the stationary member are aligned with each other. Further, during manufacturing of the linear oscillation systems, the moving member and the stationary member can have a dimensional tolerance that provides an alignment of the axes of the moving member and the stationary member.

The conventional suspension systems used in oscillation systems are bulky. Further, use of longitudinal springs in the suspension system may result in a displacement the moving member with respect to the stationary member. The displacement of the moving member with respect to the stationary member may lead to a parallel misalignment and an angular misalignment of the moving member with respect to the stationary member. Such misalignments can lead to direct contact between the moving member and the stationary member during the operation of the linear oscillation system, and hence enhanced friction between the two members.

Thus there is a need for improved suspension system configurations, improved linear oscillation systems including the suspension systems, and improved methods for assembling such linear oscillation systems.

BRIEF DESCRIPTION OF THE INVENTION

One embodiment of the present invention relates to a linear oscillation system including housing, a stationary assembly and a moveable assembly. The stationary assembly is disposed in the housing and the moveable assembly is configured to undergo a reciprocating motion with respect to the stationary assembly under the effect of an actuation mechanism. The linear oscillation system further includes a suspension system mechanically coupled between the moveable assembly and the housing. The suspension system includes a plurality of planar elastic members and a plurality of longitudinal elastic members disposed between the plurality of planar elastic members. A first end of each of the plurality of longitudinal elastic members is mechanically coupled to at least one of the plurality of longitudinal elastic members. Further, a second end of each of the plurality of longitudinal elastic members is mechanically coupled to the housing.

Another embodiment of the present invention relates to a suspension system for a linear compressor, including a first planar spring, a second planar spring, a first longitudinal spring and a second longitudinal spring. The first planar spring is configured to be mechanically coupled with a moveable assembly of the linear compressor and the second planar spring is configured to be mechanically coupled to the first planar spring. The first longitudinal spring and the second longitudinal spring are secured to a central support. The diameter of the first longitudinal spring increases as the distance along the first longitudinal spring from the first planar spring increases, and the diameter of the second longitudinal spring increases as the distance along the second longitudinal spring from the second planar spring increases.

Another embodiment of the present invention relates to a method of assembling a linear oscillation system. The method includes providing a stationary assembly attached to a first part of a housing, a moveable assembly, and a suspension system attached to a second part of the housing. The suspension system includes a plurality of planar elastic members and a plurality of longitudinal elastic members disposed between the plurality of planar elastic members. A first end of each of the plurality of longitudinal elastic members is mechanically coupled to at least one of the plurality of planar elastic members and a second end of each of the plurality of longitudinal elastic members is mechanically coupled to the housing. The method of assembling includes attaching at least one planar elastic member in the suspension system to the moveable assembly. The method further includes engaging the moveable assembly with the stationary assembly and joining the first part of the housing with the second part of the housing.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION OF THE INVENTION

Approximating language, as used herein throughout the specification and clauses, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and clauses, range limitations may be combined and/or interchanged, such ranges are identified and include all the sub-ranges contained therein unless context or language indicates otherwise.

In the following specification and the clauses, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Figure 1:
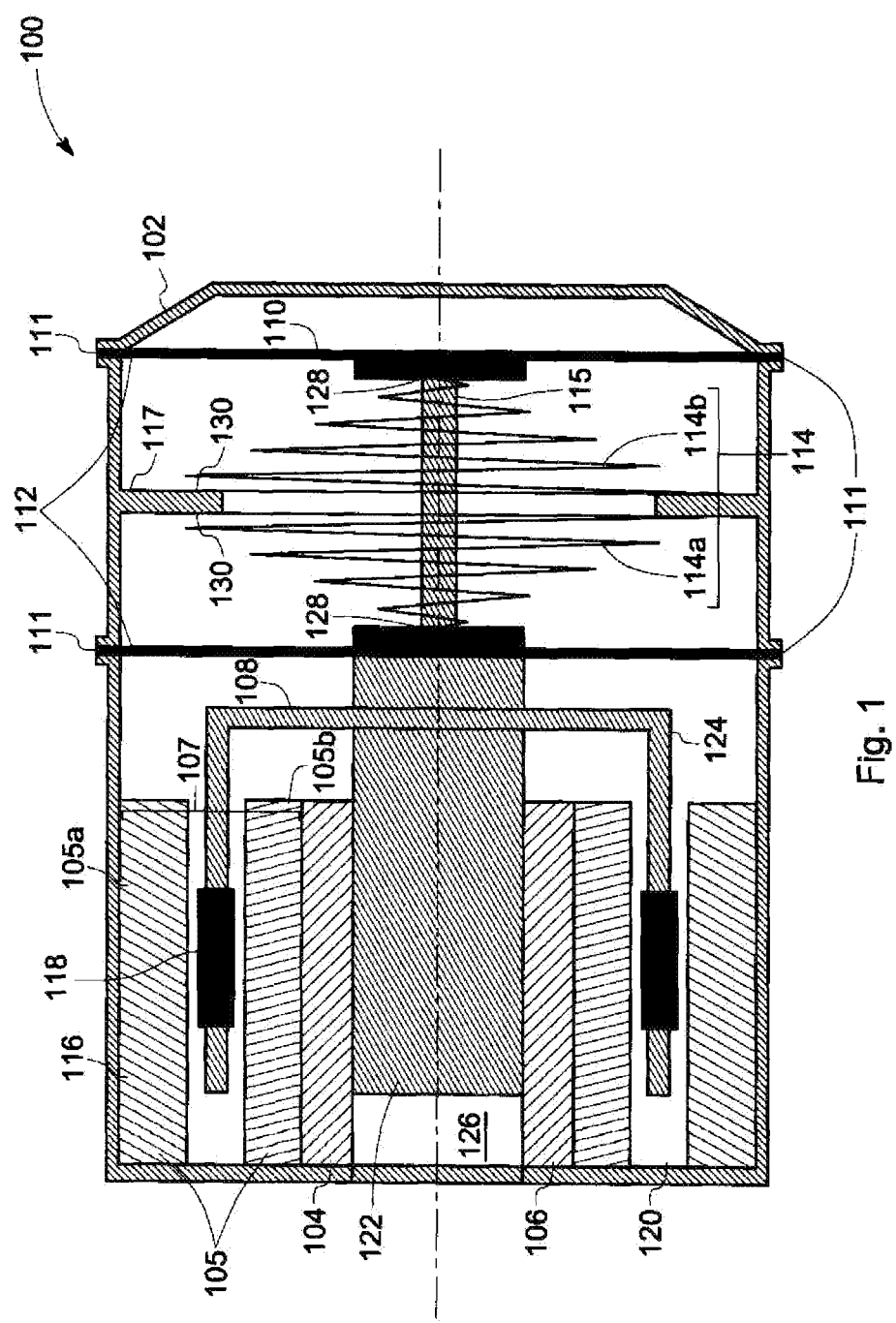
FIG. 1 illustrates a linear oscillation system, according to an embodiment of the present invention.

In one embodiment, a linear oscillation system is presented. FIG. 1 illustrates a linear oscillation system 100 according to one embodiment of the present invention. The linear oscillation system 100 as shown in FIG. 1 includes a housing 102, a stationary assembly 104 and a moveable assembly 108. The stationary assembly 104 may be immovably secured to the housing 102. The movable assembly 108 is also disposed in the housing 102 and undergoes a reciprocating motion with respect to the stationary assembly 104. According to one embodiment of the invention, the reciprocating motion of the moveable assembly 108 takes place under the effect of an actuation mechanism 107.

The linear oscillation system 100 further includes a suspension system 110 that mechanically couples the moveable assembly 108 to the housing 102, as shown in FIG. 1. The suspension system 110 may provide an axially flexible connection between the moveable assembly 108 and the housing 102. Further, the suspension system 110 may also provide a radially rigid connection between the moveable assembly 108 and the stationary assembly 104. As the moveable assembly 108 undergoes a reciprocating motion under the effect of the actuation mechanism 107, the flexible connection between the moveable assembly 108 and the housing 102 may allow the moveable assembly 108 to move linearly along an axis of the stationary assembly 104. The movement of the moveable assembly 108 may be restrained between two predetermined limits.

Referring again to FIG. 1, the suspension system 110 includes a plurality of planar elastic members 112 and a plurality of longitudinal elastic members 114 disposed between the plurality of planar elastic members 112. A first end 128 of each of the plurality of longitudinal elastic members 114 is mechanically coupled to at least one of the plurality of planar elastic members 112, and a second end 130 of each of the plurality of longitudinal elastic member is mechanically coupled to the housing 102. In some embodiments, the second end of each of the plurality of longitudinal elastic members 114 may be secured to the housing 102 by attaching the second end of each of the plurality of longitudinal elastic members 114 to a central support 117. The central support 117 may be configured to be integral to the housing 102, in some embodiments.

In one embodiment, the plurality of planar elastic members 112 may be coupled to each other using a connecting rod 115. The connecting rod 115 may be an integral part of the moveable assembly 108, in some embodiments. In some embodiments, the connecting rod 115 maybe configured to allow a passage of a fluid, for example, a refrigerant through the connecting rod 115. The suspension system 110 may be fixed to the housing 102 at a plurality of fastening points 111.

According to one embodiment of the invention, each of the plurality of longitudinal elastic members 114 includes a longitudinal spring having a variable diameter along the axis of the longitudinal spring. According to one embodiment, the diameter of each longitudinal spring varies linearly along at least a portion of the longitudinal spring. According to some embodiments, at least one of the plurality of planar elastic members 112 includes a diaphragm spring that may be circular in shape. The variable diameters of the longitudinal springs may allow the plurality of planar elastic members 112 to be placed substantially close to each other, hence allowing the linear oscillation system 100 to be configured to have a smaller axial length as compared to conventional oscillation systems. Further, the variable diameters of the longitudinal springs may also provide a non-linear behaviour, which may be desirable in certain applications for the linear oscillation system 100.

In some embodiments, as a result of the mechanical coupling of the moveable assembly 108 with the suspension system 110, the suspension system 110 may be displaced when the moveable assembly 108 moves. According to one embodiment of the invention, the suspension system 110 includes a first longitudinal elastic member 114a and a second longitudinal elastic member 114b, as shown in FIG. 1. The first longitudinal elastic member 114a is configured to elongate and the second longitudinal elastic member 114b is configured to compress when the suspension system 110 is displaced in a first direction. Further, the first longitudinal elastic member 114a is configured to compress and the second longitudinal elastic member 114b is configured to elongate when the suspension system 110 is displaced in a second direction.

According to one embodiment of the invention, the actuation mechanism 107 is an electromagnetic system and the electromagnetic system includes at least one electrical coil 116 and at least one magnet 118. An electromagnetic interaction takes place between the electrical coils 116 and the magnets 118, and the electromagnetic interaction produces an electromagnetic force. The electromagnetic force imparts a linear motion to the moveable assembly 108. According to the embodiment illustrated in FIG. 1, the electrical coils 116 are attached to the stationary assembly 104 and the magnets 118 are attached to the moveable assembly 108.

Further, according to one embodiment of the invention, as shown in FIG. 1, the plurality of electrical coils 116 are disposed over a stator 105. The stator 105 is defined by a hollow annular chamber 120 and the plurality of electrical coils 116 are disposed on at least one lateral surface of the hollow annular chamber 120. The lateral surfaces of the hollow annular chamber 120 over which the electrical coils 116 are disposed constitutes a stator core. The stator core can be made of a ferromagnetic material. When an electric current is passed through the electrical coils 116, the stator 105 turns into an electromagnet. In some embodiments, the hollow annular chamber 120 can have two lateral surfaces and hence in such a case, the stator 105 comprises an outer stator 105a and an inner stator 105b, as shown in FIG. 1.

With continued reference to FIG. 1, the stationary assembly 104 further includes a cylinder 106 that is disposed within the inner stator 105b such that an inner surface of the inner stator 105b and an outer surface of the cylinder 106 are in contact with each other. The moveable assembly 108 includes a piston 122 and a cylindrical magnet holding member 124. As mentioned earlier, the piston 122 undergoes a reciprocating motion in the cylinder 106. The piston 122 and the cylindrical magnet holding member 124 may be mechanically coupled to each other, such that they move together. The magnets 118 may be disposed on at least one surface of the cylindrical magnet holding member 124. Electromagnetic interactions may take place between the magnets 118 and the electrical coils 116 disposed on the outer stator 105a, and electromagnetic interactions may also take place between the magnets 118 and the electrical coils 116 disposed on the inner stator 105b. A combination of both of these electromagnetic interactions may produce an electromagnetic force, which causes the piston 122 to move.

In some embodiments, the linear oscillation system 100 as described in the present invention may be used as a linear compressor in a refrigeration unit, for example a household refrigerator. In a refrigerator, a compressor is used to compress a refrigerant. In a household refrigerator, as the refrigerant passes through one or more evaporators, the refrigerant absorbs heat from one or more refrigerator compartments and hence produces a cooling effect. In the evaporator, the refrigerant undergoes an expansion and the expanded refrigerant needs to be compressed for a next refrigeration cycle. The compression of the refrigerant is carried out in the compressor.

A recent development in the field of compressors for refrigerators has been the use of linear compressors. Linear compressors have a simplified mechanical structure in comparison to the conventional reciprocating compressors. With a reduction in the number of moving and rotating parts, a linear compressor consumes lesser energy and hence provides a higher efficiency as compared to the conventional reciprocating compressors. When the linear oscillation system 100 as described in accordance with some embodiments of the present invention is implemented as a linear compressor for a refrigerator, a space defined in the cylinder 106 and enclosed by the piston 122 is a compression chamber 126. As a result of the reciprocating motion of the piston 122, a refrigerant is compressed in the compression chamber 126. The compression chamber 126 can comprise an inlet (not shown) for the refrigerant to enter the compression chamber and an outlet (not shown) for the refrigerant to exit from the compressor chamber 126.

Figure 2A:
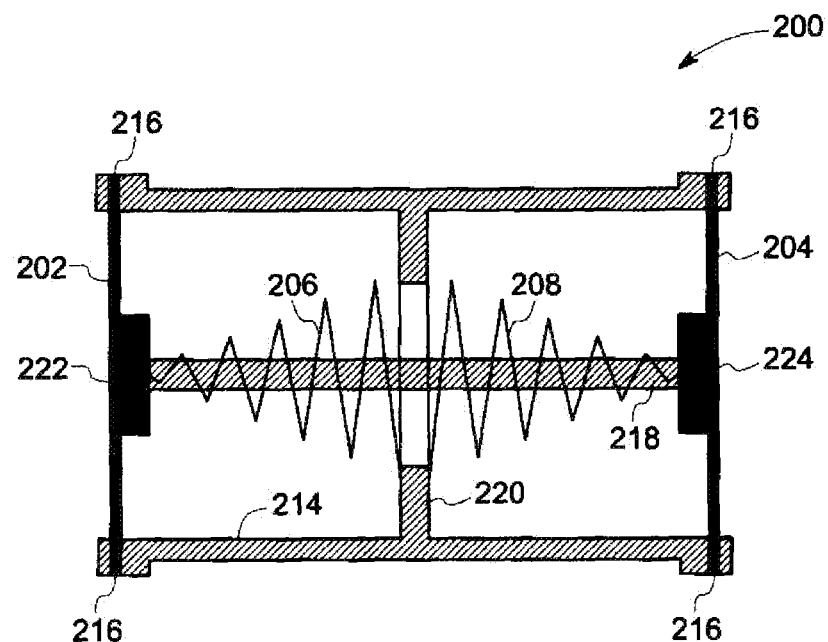
FIG. 2A illustrates a suspension system, according to an embodiment of the present invention.

FIG. 2A illustrates a suspension system 200 for a linear compressor according to one embodiment of the present invention. The linear compressor may be an example of configuration of the linear oscillation system as described in FIG. 1. As shown in FIG. 2A, the suspension system 200 includes two planar springs—a first planar spring 202 and a second planar spring 204. The first planar spring 202 is configured to be mechanically coupled to a moveable assembly (not shown in FIG. 2A) of a linear compressor by attaching a portion of the first planar spring 202 with the moveable assembly of the linear compressor. The second planar spring 204 is configured to be mechanically coupled to the first planar spring 202 such that the first planar spring 202 and the second planar spring 204 move together in a particular direction, depending on the direction of movement of the moveable assembly of the linear compressor. The suspension system 200 further includes a first longitudinal spring 206 and a second longitudinal spring 208. The first longitudinal spring 206 is mechanically coupled to the first planar spring 202 and the second longitudinal spring 206 is mechanically coupled to the second planar spring 204. The first longitudinal spring 206 and the second longitudinal spring 208 are secured to a central support 220. According to one embodiment of the suspension system 200, the central support 220 is configured to be integral to a suspension system housing 214.

In some embodiments, the second planar spring 204 may be mechanically coupled to the first planar spring 202 using a connecting road 218. The connecting rod 218 may be integrally connected to the moveable assembly of the linear compressor. The first longitudinal spring 206 may be mechanically coupled to the first planar spring 202 by attaching a central portion 222 of the first planar spring 202 with an end of the first longitudinal spring 206. The second longitudinal spring 208 may be mechanically coupled to the second planar spring 204 by attaching a central portion 224 of the second planar spring 204 with an end of the second longitudinal spring 208. The first planar spring 202 and the second planar spring 204 may be attached to the suspension system housing 214 by fastening the planar springs 202, 204 to the suspension system housing 214 at a plurality of fastening points 216.

The first longitudinal spring 206 and the second longitudinal spring 208 have variable diameters along the respective axes of the first longitudinal spring 206 and the second longitudinal spring 208. The diameter of the first longitudinal spring 206 increases as the distance along the first longitudinal spring 206 from the first planar spring 202 increases, and the diameter of the second longitudinal spring 208 increases as the distance along the second longitudinal spring 208 from the second planar spring 204 increases.

Figure 2B:
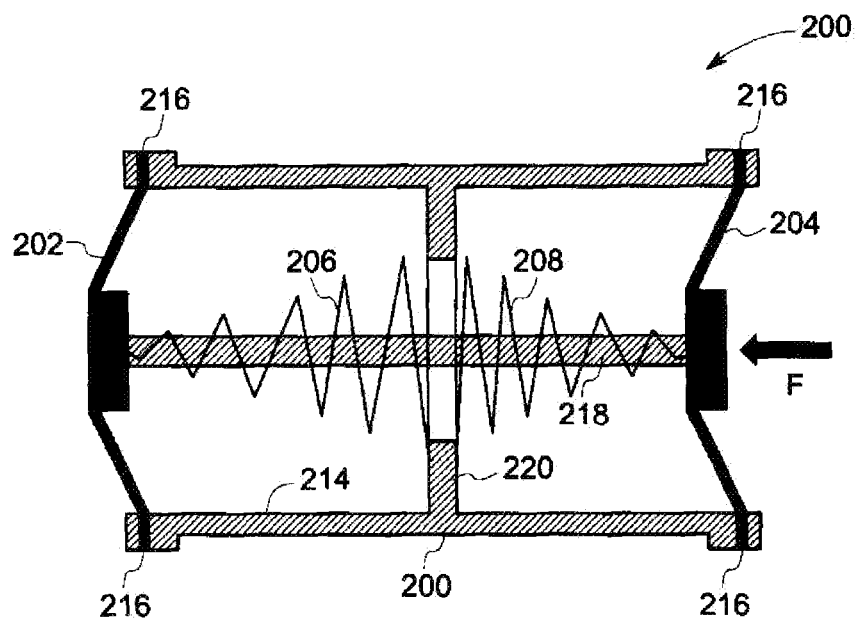
FIG. 2B illustrates a displaced state of the suspension system, according to an embodiment of the present invention.

FIG. 2B illustrates a suspension system 200 configuration, in which the suspension system 200 is displaced by applying a force F to one of the ends of the suspension system 200. The force F can be applied as a result of the movement of the moveable assembly of the linear compressor, for example. As a result of the application of the force F, the first planar spring 202 and the second planar spring 204 are displaced in the direction of application of the force F. Further, as a result of the application of the force F, one of the first longitudinal spring 206 and the second longitudinal spring 208 is compressed and the other is elongated. When the two planar springs 202, 204 are displaced in one direction, the first longitudinal spring 206 elongates and the second longitudinal spring 208 compresses, and when the two planar springs 202, 204 are displaced in another direction, the first longitudinal spring 206 compresses and the second longitudinal spring 208 elongates (not shown in FIG. 2B). As a result of the variable diameters of the first longitudinal spring 206 and the second longitudinal spring 208, the first planar spring 202 and the second planar spring 204 can be positioned relatively close to each other. This may lead to an overall reduction in size of the suspension system 200 and of the linear compressor in which the suspension system 200 is used.

Figure 3A:
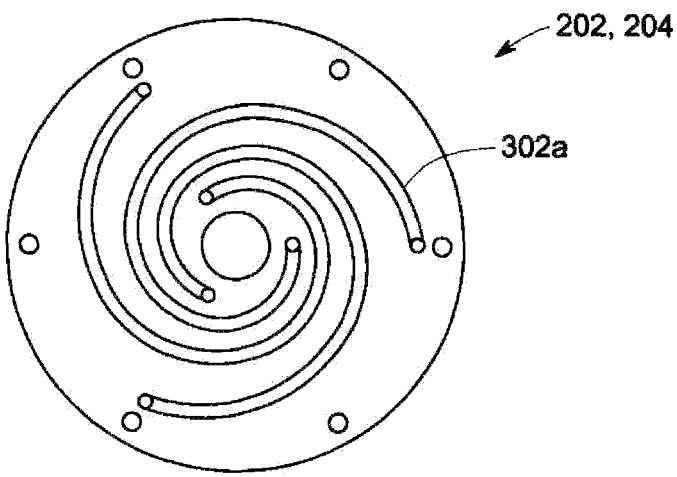
FIGS. 3A, 3B, 3C illustrate different embodiments of planar springs used in the suspension system, according to an embodiment of the present invention.
Figure 3B:
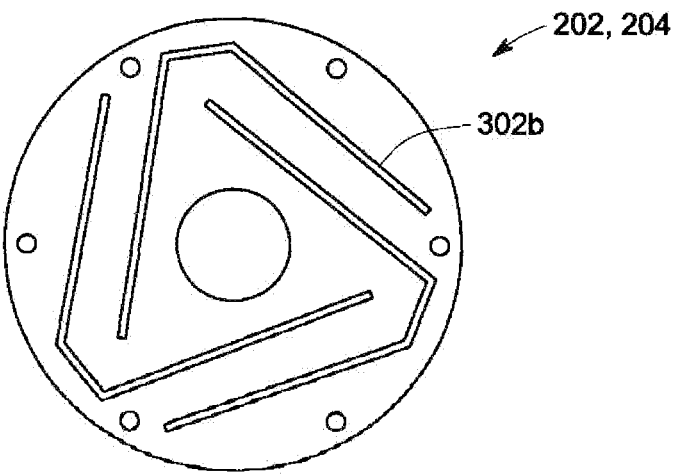
Figure 3C:
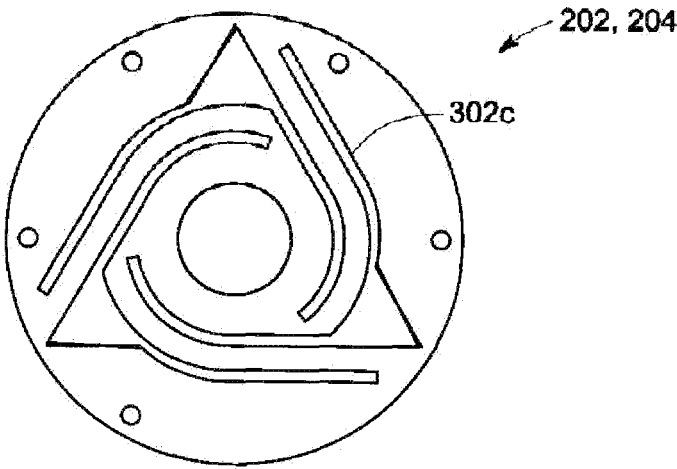

FIGS. 3A, 3B and 3C illustrate different configurations of the first planar spring 202 and the second planar spring 204 that can be used in the suspension system 200 in accordance with some embodiments the present invention. In the embodiments illustrated in FIGS. 3A, 3B, and 3C, the planar springs 202, 204 are circular in shape and have cuts 302a, 302b, 302c made therein. The cuts 302a, 302b, 302c in the planar springs 202, 204 provide an elastic effect to the planar springs 202, 204. There can be multiple ways in which the cuts are made in the planar springs 202, 204 and three exemplary designs of the cuts are represented in the FIGS. 3A, 3B and 3C.

Figure 4:
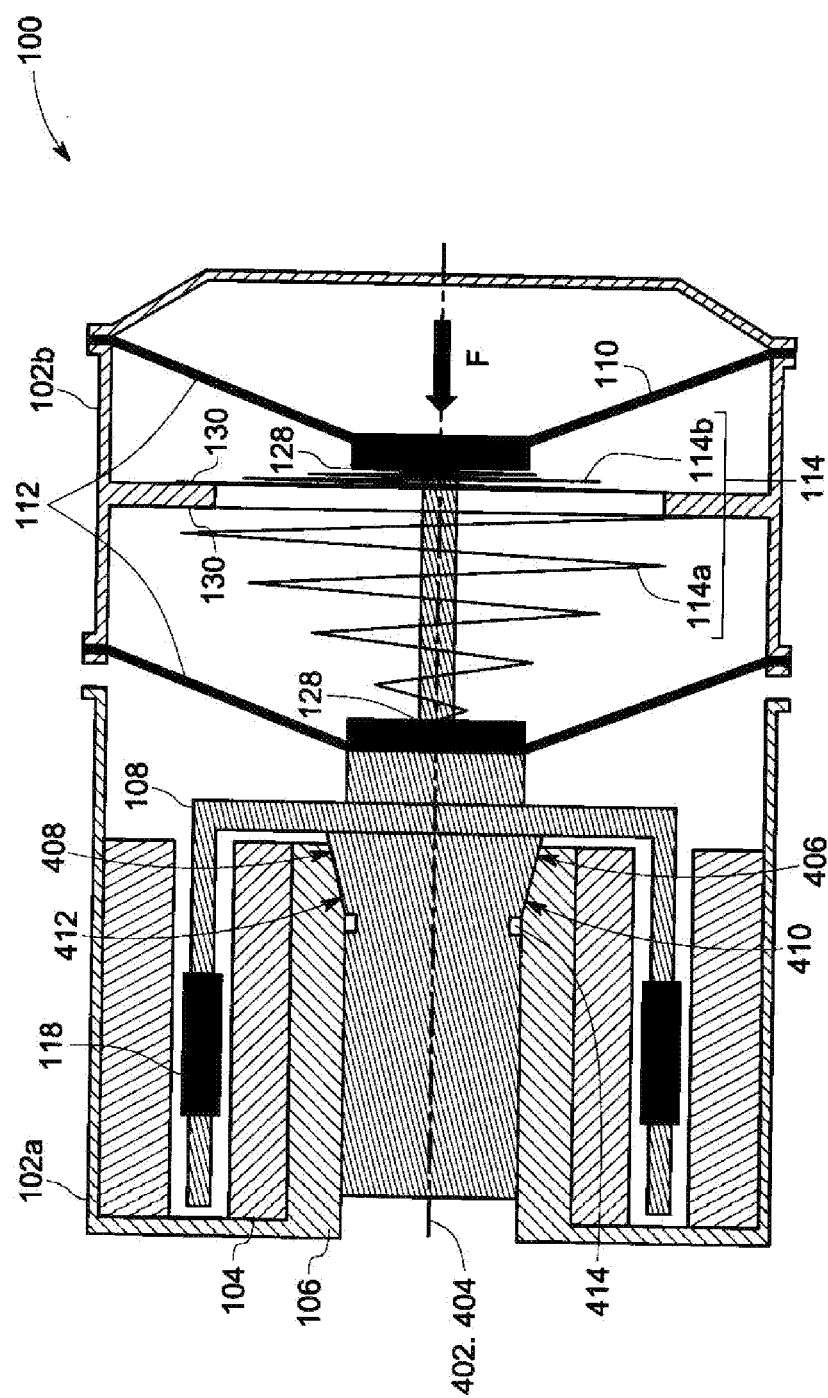
FIG. 4 illustrates the linear oscillation system during the method of assembling of the linear oscillation system.

In one embodiment, a method of assembling the linear oscillation system 100 (illustrated in FIG. 1) is also presented. A method of assembling the linear oscillation system 100 is shown in FIG. 4. The method includes providing, a first part of the housing 102a, a second part of the housing 102b, a moveable assembly 108, and a suspension system 110. A stationary assembly 104 is attached to the first part of the housing 102a and the suspension system 110 is attached to the second part of the housing 102b. The suspension system 110 includes a plurality of planar elastic members 112 and at a plurality of longitudinal elastic members 114 disposed between the plurality of planar elastic members 112. A first end 128 of each of the plurality of longitudinal elastic members 114 is mechanically coupled to at least one of the plurality of planar elastic members 112 and a second end 130 of each of the plurality of the longitudinal elastic members 114 is mechanically coupled to the housing 102.

According to one embodiment, the method includes attaching at least one planar elastic member in the plurality of the planar elastic members 112 to the moveable assembly 108. The method further includes engaging the moveable assembly 108 with the stationary assembly 104. The plurality of planar springs 112 may be deformed as a result of an application of a force F during the step of engaging.

The method further includes joining the first part of the housing 102a with the second part of the housing 102b. During the joining, a combined assembly of the first part of the housing 102a, the stationary assembly 104 and the moveable assembly 108 is displaced such that the first part of the housing 102a is joined with the second part of the housing 102b.

According to an embodiment, the stationary assembly 104 includes a cylinder 106 and the moveable assembly 108 includes a piston 122. In some embodiments, for a proper functioning of the linear oscillation system 100, a piston axis 402 of the piston 122 and a cylinder axis 404 of the cylinder 106 may be aligned to each other. In the method of assembling the linear oscillation system 100, the engaging of the moveable assembly 108 to the stationary assembly 104 is carried out by engaging the cylinder 106 with the piston 122. In some embodiments, the method includes contacting a first tapered section 406 formed on an external surface 410 of the piston with the second tapered section 408 formed on an internal surface 412 of the cylinder 106. The first tapered section 406 and the second tapered section 408 may be configured to be concentric to the cylinder 106 and the piston 122. As a result of the contacting of the first tapered section 406 with the second tapered section 408, a proper alignment between the piston 122 and the cylinder 106 may be maintained. The tapering angles of the first tapered section 126 and the second tapered section 128 are in the range of a few degrees.

According to some embodiments, the first part of the housing 102a includes a first flange 130a and the second part of the housing 102b comprises a second flange 130b. The joining of the first part of the housing 102a to the second part of the housing 102b may be carried out by joining the first flange 130a with the second flange 130b, in some embodiments. In some embodiments, the first flange 130a and the second flange 130b may be ring-shaped structures and may be integral to the first part of the housing 102a and the second part of the housing 102b, respectively.

Figure 5:
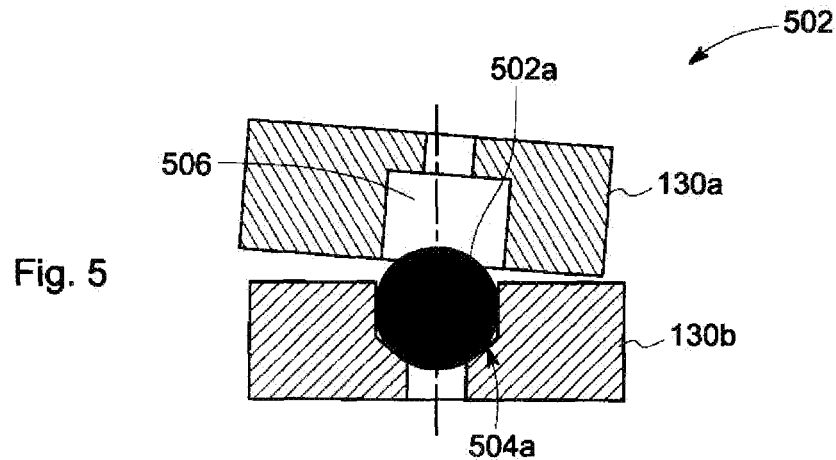
FIG. 5 illustrates a location of a ball during the method of assembling of the linear oscillation system, according to an embodiment of the present invention.

According to an example method of joining the first flange 130a with the second flange 130b, three balls are used to define a plane of contact between the first flange 130a and the second flange 103b. FIG. 5 illustrates the location of one such ball 502a during the joining of the first flange 130a with the second flange 130b. The method includes introducing the ball 502a in a slot 504a created in the second flange 130b. A counterface 506 may be disposed on the first flange 130b. The counterface 506 can be made of a soft or a ductile material with about zero creep or relaxation, for example, annealed copper.

During the joining of the first flange 130a with the second flange 130b, as the first flange 130a is brought close to the second flange 130b, the method further includes indenting the ball 502a into the counterface 506 disposed on the first flange 130a. Similarly, the method also includes indenting two other balls (not shown in FIG. 5) into corresponding portions of the counterpace 506 disposed on the first flange 130a. The indenting of the three balls into the counterface 506 is carried out in a stepwise manner. As a result, the first flange 130a and the second flange 130b are joined with each other at the defined plane of contact.

According to some embodiments, when all the three balls are indented into the substrate 506, a plane of contact between the first flange 130a and the second flange 130b is defined. As a result of the defining of the plane of contact, the piston 122 is aligned substantially perpendicular to the cross-section of the cylinder 106, and a proper alignment of the piston axis 402 and the cylinder axis 404 is ensured. Hence, an angular misalignment and a parallel misalignment of the piston 122 with respect to the cylinder 106 during the operation of the linear oscillation system 100 may be avoided.

Figure 6:
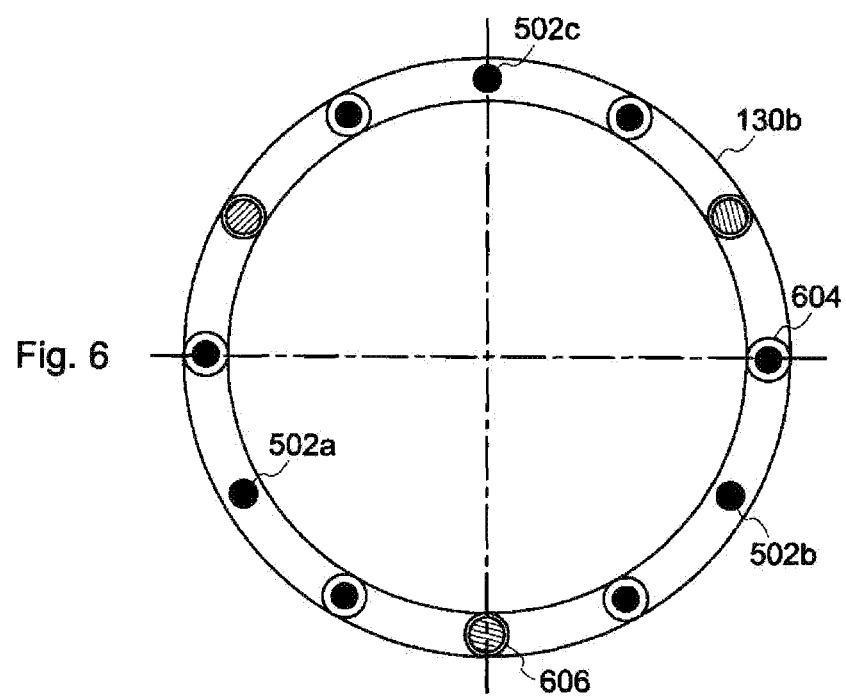
FIG. 6 illustrates a second flange during the method of assembling of the linear oscillation system.

FIG. 6 illustrates the second flange 130b during an assembling step, according on an embodiment of the present invention. According to this embodiment, the three balls 502a, 502b, 502c are arranged substantially equidistant to each other along the circumference of the second flange 130b. The second flange 130b further includes a plurality of clamping points 604 and a plurality of fastening points 606. The method further includes clamping the first flange 130a and the second flange 130b to each other after the plane of contact between the first flange 130a and the second flange 130b has been defined. The clamping can be carried out at the plurality of clamping points 604, by known techniques, for example, bolting. A planar spring in the plurality of planar springs 112 can also be fastened to the second flange by fastening means, for example, screws. The fastening of the planar spring with the second flange 130b may be carried out at each of the plurality of fastening points 606.

The present invention has been described in terms of some specific embodiments. They are intended for illustration only, and should not be construed as being limiting in any way. Thus, it should be understood that modifications can be made thereto, which are within the scope of the invention and the appended clauses. Furthermore, all of the patents, patent applications, articles, and texts which are mentioned above are incorporated herein by reference.

What we claim is:

1. A linear oscillation system comprising:
   a housing;
   a stationary assembly disposed in the housing;
   a moveable assembly disposed in the housing, wherein the moveable assembly is configured to undergo a reciprocating motion with respect to the stationary assembly, under the effect of an actuation mechanism; and
   a suspension system mechanically coupled between the moveable assembly and the housing, wherein the suspension system comprises a plurality of planar elastic members and a plurality of longitudinal elastic members disposed between the plurality of planar elastic members, and wherein a first end of each of the plurality of longitudinal elastic members is mechanically coupled to at least one of the plurality of planar elastic members, and a second end of each of the plurality of longitudinal elastic members is mechanically coupled to the housing,
   wherein the plurality of planar elastic members comprises a first planar elastic member and a second elastic member, and wherein the plurality of longitudinal elastic member comprises a first longitudinal spring and a second longitudinal spring, the first longitudinal spring having a variable diameter increasing along a corresponding axis from the first planar elastic member to the second longitudinal spring, and the second longitudinal spring having a variable diameter increasing along a corresponding axis from the second planar elastic member to the first longitudinal spring.

2. The linear oscillation system as defined in claim 1, wherein the plurality of longitudinal elastic members comprises a first longitudinal elastic member and a second longitudinal elastic member, and wherein the first longitudinal elastic member is configured to elongate and the second longitudinal elastic member is configured to compress when the suspension system is displaced in a first direction, and wherein the first longitudinal elastic member is configured to compress and the second longitudinal elastic member is configured to elongate when the suspension system is displaced in a second direction.

3. The linear oscillation system as defined in claim 1, wherein at least one of the plurality of planar elastic members comprises a circular diaphragm spring.

4. The linear oscillation system as defined in claim 1, wherein the actuation mechanism comprises at least one electrical coil and at least one magnet, and wherein the actuation mechanism is configured such that an electromagnetic interaction between the electrical coil and the magnet produces a linear motion.

5. The linear oscillation system as defined in claim 1, wherein the stationary assembly comprises a stator and a cylinder disposed within the stator, and wherein the stator is defined by a hollow annular chamber and a plurality of electrical coils disposed on at least one surface of the hollow annular chamber.

6. The linear oscillation system as defined in claim 5, wherein the moveable assembly comprises a piston, a cylindrical magnet holding member, and at least one magnet disposed on at least one surface of the cylindrical magnet holding member, and wherein the piston is configured to move in the cylinder and the cylindrical magnet holding member is configured to move in the hollow annular chamber.

7. The linear oscillation system as defined in claim 1, wherein the reciprocating motion of the moveable assembly is configured to bring about a compression of a refrigerant.

8. A refrigerator comprising the linear oscillation system as defined in claim 1.

9. A linear oscillation system comprising:
   a housing;
   a stationary assembly disposed in the housing;
   a moveable assembly disposed in the housing, wherein the moveable assembly is configured to undergo a reciprocating motion with respect to the stationary assembly, under the effect of an actuation mechanism; and
   a suspension system mechanically coupled between the moveable assembly and the housing, wherein the suspension system comprises a plurality of planar elastic members and a plurality of longitudinal elastic members disposed between the plurality of planar elastic members, and wherein a first end of each of the plurality of longitudinal elastic members is mechanically coupled to at least one of the plurality of planar elastic members, and a second end of each of the plurality of longitudinal elastic members is mechanically coupled to the housing,
   wherein the plurality of planar elastic members comprises a first planar elastic member and a second elastic member,
   wherein the plurality of longitudinal elastic member comprises a first longitudinal spring and a second longitudinal spring, the first longitudinal spring having a variable diameter increasing along a corresponding axis from the first planar elastic member to the second longitudinal spring, and the second longitudinal spring having a variable diameter increasing along a corresponding axis from the second planar elastic member to the first longitudinal spring,
   wherein each of the plurality of planar elastic members comprises a circular diaphragm spring, and
   wherein the reciprocating motion of the moveable assembly is configured to bring about a compression of a refrigerant.

10. The linear oscillation system as defined in claim 9, wherein the plurality of longitudinal elastic members comprises a first longitudinal elastic member and a second longitudinal elastic member, and wherein the first longitudinal elastic member is configured to elongate and the second longitudinal elastic member is configured to compress when the suspension system is displaced in a first direction, and wherein the first longitudinal elastic member is configured to compress and the second longitudinal elastic member is configured to elongate when the suspension system is displaced in a second direction.

11. The linear oscillation system as defined in claim 9, wherein the actuation mechanism comprises at least one electrical coil and at least one magnet, and wherein the actuation mechanism is configured such that an electromagnetic interaction between the electrical coil and the magnet produces a linear motion.

12. The linear oscillation system as defined in claim 9, wherein the stationary assembly comprises a stator and a cylinder disposed within the stator, and wherein the stator is defined by a hollow annular chamber and a plurality of electrical coils disposed on at least one surface of the hollow annular chamber.

13. The linear oscillation system as defined in claim 12, wherein the moveable assembly comprises a piston, a cylindrical magnet holding member, and at least one magnet disposed on at least one surface of the cylindrical magnet holding member, and wherein the piston is configured to move in the cylinder and the cylindrical magnet holding member is configured to move in the hollow annular chamber.

14. A refrigerator comprising the linear oscillation system as defined in claim 9.

\* \* \* \* \*